July 28, 1964

C. H. GOODWIN 3,142,476

FLUID MIXING APPARATUS

Filed Feb. 2, 1962

*INVENTOR.*
CHESTER H. GOODWIN

BY Robert L. Broad Jr.

ATTORNEY

United States Patent Office

3,142,476
Patented July 28, 1964

1

3,142,476
FLUID MIXING APPARATUS
Chester H. Goodwin, Decatur, Ala., assignor, by mesne assignments, to Monsanto Company, a corporation of Delaware
Filed Feb. 2, 1962, Ser. No. 170,761
5 Claims. (Cl. 259—6)

This invention relates to fluid mixing apparatus and more particularly to apparatus for dispersing a pigment in a spinning solution.

It is well known that there are many cases where the success of an operation depends upon the thorough mixing of a viscous fluid used in the operation. In particular, such an operation is the spinning of pigmented chemical filaments. Since the pigment is used to obtain a desired color in the spun filament, it is absolutely necessary that the pigmented be thoroughly mixed into or dispersed in the "dope" or spinning solution from which the filaments are to be spun. If the pigment is not uniformly dispersed in the spinning solution, the colors of the spun filaments may vary from the desired color. With this problem in mind, one of the objects of this invention is to provide a novel and improved mixing apparatus.

Another object of this invention is to provide an apparatus for dispersing a pigment in a fluid.

A further object of this invention is to provide a gear mixer wherein a fluid to be mixed is passed through a plurality of mixing stages and between these stages is forced to travel counter to the direction of movement of the teeth on a driving gear.

A still further object of this invention is to provide a gear mixer having a sun gear driving a plurality of planetary gears to form a plurality of mixing stages, the fluid to be mixed traveling from one stage to another counter to the movement of the teeth on the sun gear.

One embodiment of the present invention contemplates a fluid mixer having a sun gear mounted in a housing and meshed with a plurality of planetary gears to form a plurality of mixing stages. The housing is cut away from the periphery of the sun gear between the mixing stages so the fluid can flow from one stage to another. Between the stages the fluid is forced to move in a direction counter to the rotation of the sun gear. This, in addition to mixing done in the mixing stages, insures a very thorough mixing operation.

Figure 1:
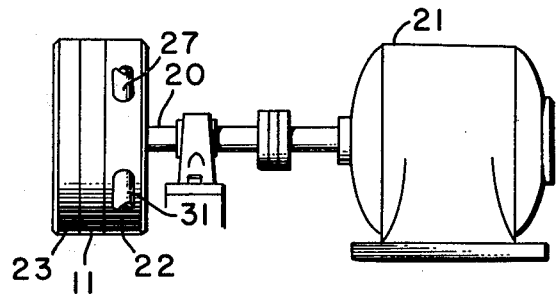
Figure 2:
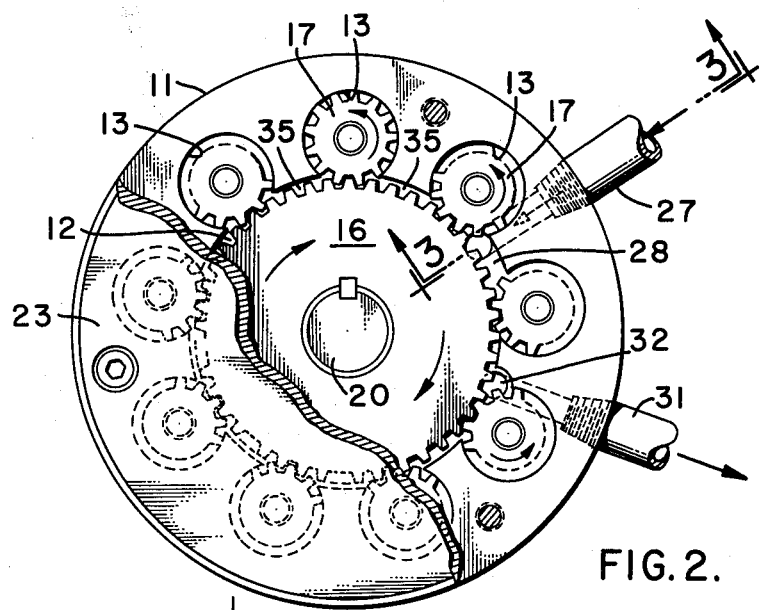
Figure 3:
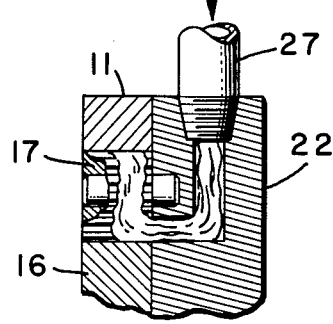

Other objects and advantages will become apparent when the following detailed description is read in conjunction with the drawing, in which FIGURE 1 is a side view of one embodiment of the invention showing the general arrangement of the apparatus;

FIGURE 2 is an enlarged sectional view showing the mixing gears mounted in a housing; and FIG. 3 is a sectional view taken on line 3—3 of FIGURE 2 showing the construction of the fluid inlet port.

Referring now in detail to the drawing, there is shown a flat housing or plate 11 having an arcuate central opening 12 and a plurality of arcuate openings 13 interconnected with and spaced around the central opening 12. A sun gear 16 rotatably mounted in the central opening 12 in the housing 11 meshes with a plurality of planetary gears 17 rotatably mounted in the openings 13 to form a plurality of mixing stages. The sun gear 16 is secured to a shaft 20 which is driven by a motor 21 (FIGURE 1) for rotating the gears 16 and 17. A pair of plates 22 and 23 secured on opposite sides of the housing 11 serve to confine the gears 16 and 17 in the openings 12 and 13.

An inlet pipe 27 directs the spinning solution carrying the pigment to be dispersed therein through the plate 22 into an inlet chamber 28 in the housing 11 where the mixing operation begins. An outlet pipe 31 extends through the plate 22 and is connected with an outlet chamber 32 in the housing 11 for discharging the mixed solution from the mixer.

The arcuate openings 13 positioned between the inlet chamber 28 and the outlet chamber 32 in a counterclockwise direction (FIGURE 2) from the inlet chamber are of a diameter as near as possible to the diameter of the gears 17 so that the spinning solution or dope is carried between the teeth of the gears 17 in the openings 13 to insure a positive feed of the spinning solution through the device.

Passages 35 between the sun gear 16 and the housing 11 are provided for permitting the spinning solution to flow counterclockwise around the gear 16, which is moving clockwise. The passageways 35 are formed by recessing the housing between the openings 13 to provide a space between the walls of the opening 12 and the ends of the teeth on the sun gear 16. Between the inlet chamber 28 and the outlet chamber 32 in a clockwise direction from the inlet chamber 28, the walls of the housing 11 practically engage the gear 16 to prevent a flow of spinning solution past the outlet chamber 32.

In operation of the device, the motor 21 drives the shaft 20 to rotate the sun gear 16 in a clockwise direction and the planetary gears 17 in a counterclockwise direction (FIGURE 2). The spinning solution is fed into the inlet pipe 27 and then is carried around the peripheries of the gears 17 and through the passages 35 in a counterclockwise direction until it reaches the outlet chamber 32 from which it passes through the outlet pipe 31.

Because of the direction of rotation of the gears, the fluid is forced to flow through the passageways 35 between mixing stages counter to the direction of movement of the teeth on the sun gear 16. Thus, the fluid in the passages 35 is mixed additionally by the oppositely moving teeth on the sun gear 16. This insures a thorough mixing operation.

It is to be understood that the embodiment disclosed herein may be altered or modified and that many other embodiments may be contemplated without departing from the spirit and scope of the invention.

What is claimed is:

1. A mixing device, comprising a sun gear, a plurality of planetary gears meshed with the sun gear to form a plurality of fluid mixing units extending through an arc from an inlet unit around the sun gear to an outlet unit, and a housing enclosing the gears, said housing being recessed along said arc to provide a space between the periphery of the teeth on the sun gear and said housing to provide passageways between said mixing units so that the fluid can flow around the sun gear in a direction counter to the movement of said teeth, the remainder of said housing being positioned substantially in engagement with said teeth.

2. A fluid mixing device, comprising a housing having an arcuate central opening interconnected with a plurality of arcuate secondary openings, a sun gear positioned in the central opening in the housing, a plurality of planetary gears positioned in the secondary openings and meshed with the sun gear to form a plurality of fluid mixing units leading from an inlet unit to an outlet unit, the diameter of that portion of the central opening between the inlet and outlet units being such that the teeth of the sun gear are spaced from the walls of said central opening along said portion to provide fluid passageways between the teeth on the sun gear and said walls, the remainder of said central opening having a diameter substantially equal to the diameter of the sun gear, and means for driving the gears to force the fluid through said passageways in a direction counter to the direction of movement of said teeth.

3. A mixing device comprising a flat housing having a central arcuate opening interconnected with a plurality of arcuate secondary openings spaced around said central opening, a sun gear positioned in the central opening for clockwise movement, a plurality of planetary gears positioned in the secondary openings and meshed with the sun gear to form a plurality of fluid mixing units leading in a counterclockwise direction from an inlet unit to an outlet unit, and means secured to opposite sides of the housing for confining the gears therein, said housing being recessed between the secondary openings along a counter-clockwise arc from the inlet unit to the outlet unit to provide a fluid passageway between the housing and the teeth on the sun gear so that the fluid flows through these passageways counter to movement of said teeth on said sun gear, that portion of said central opening extending in a clockwise direction from the inlet opening to the outlet opening having a diameter substantially equal to the diameter of the sun gear.

4. A fluid mixing device, comprising a flat central plate having therein an arcuate central opening interconnected with a plurality of arcuate secondary openings spaced around the central opening, a sun gear positioned in the central opening, a plurality of planetary gears secured in the secondary openings and meshed with the sun gear to provide a plurality of fluid mixing units leading along a path from an inlet unit to an outlet unit, a pair of side plates positioned on opposite sides of the central plate for confining the gears and the fluid to be mixed, said arcuate central opening having along said paths a diameter such that a space is provided between the wall of said central opening and the ends of the teeth on the sun gear so that the fluid to be mixed can flow from one mixing unit to another through said space in a direction counter to the direction of movement of said teeth, the remainder of said central plate being positioned substantially in engagement with the teeth on the sun gear, and means connected to the sun gear for driving said mixing units.

5. A device for mixing a fluid, comprising a flat central plate having therein an arcuate central opening interconnected with a plurality of arcuate secondary openings spaced around said central opening, a sun gear positioned in the central opening, a plurality of planetary gears positioned in the secondary openings and meshed with the sun gear to form a plurality of mixing units, a pair of side plates positioned on opposite sides of the central plate for retaining the fluid therein, one of said side plates having therein an inlet port leading to one of said mixing units and an outlet port leading from another of said units, said central plate having a portion thereof cut away to provide a space between the housing and the teeth on the sun gear between an inlet mixing unit and an outlet mixing unit, said space providing for passage of the fluid between the mixing units in a direction counter to the direction of movement of said teeth, the remainder of said central plate being positioned substantially in engagement with the teeth on the sun gear, and means connected to the sun gear for driving said mixing units.

References Cited in the file of this patent
UNITED STATES PATENTS
2,681,621     Hedman _____ June 22, 1954